(12) United States Patent
Bittner

(10) Patent No.: US 6,922,998 B2
(45) Date of Patent: Aug. 2, 2005

(54) APPARATUS AND METHOD FOR A HEAT ENGINE

(76) Inventor: George E. Bittner, 7794 Hattenback Rd., Cleveland, NY (US) 13042

( * ) Notice: Subject to any disclaimer, the term of this patent is extended or adjusted under 35 U.S.C. 154(b) by 0 days.

(21) Appl. No.: 10/803,147

(22) Filed: Mar. 17, 2004

(65) Prior Publication Data

US 2004/0172941 A1 Sep. 9, 2004

Related U.S. Application Data

(62) Division of application No. 09/931,607, filed on Aug. 16, 2001, now abandoned.

(51) Int. Cl.[7] .............................. B60K 16/00; F01K 7/00
(52) U.S. Cl. ...................... 60/641.8; 60/641.15; 60/675
(58) Field of Search .......................... 60/641.8, 641.11, 60/641.15, 670, 675

(56) References Cited

U.S. PATENT DOCUMENTS

| | | | | |
|---|---|---|---|---|
| 3,509,716 A | * | 5/1970 | Avery ........................... | 60/675 |
| 3,941,030 A | * | 3/1976 | Massung ...................... | 91/4 R |
| 3,984,985 A | * | 10/1976 | Lapeyre ................... | 60/641.13 |
| 4,121,420 A | * | 10/1978 | Schur ........................... | 60/531 |
| 4,195,483 A | * | 4/1980 | Myers et al. .................. | 60/530 |
| 4,344,286 A | * | 8/1982 | Warner ......................... | 60/531 |
| 4,355,516 A | * | 10/1982 | Jones ........................... | 60/675 |
| 4,372,123 A | * | 2/1983 | Austin ......................... | 60/639 |
| 4,509,329 A | * | 4/1985 | Breston ....................... | 60/531 |
| 4,577,464 A | * | 3/1986 | Weinert ....................... | 60/531 |
| 5,758,501 A | * | 6/1998 | Jirnov et al. .................. | 60/670 |

* cited by examiner

*Primary Examiner*—Hoang Nguyen
(74) *Attorney, Agent, or Firm*—Robert J. Sinnema; Bond, Schoeneck & King, PLLC

(57) ABSTRACT

A heat engine includes a plurality of heating side expansion chambers and cooling side expansion chambers, positioned on opposite sides of an axis, for providing rotation of an apparatus about its axis when the fluids inside the chambers expand and contract on the same side and plane of a rotational axis. This is accomplished by, shifting the weight of fluids off-balance, or a weight, when the fluid, expands and exerts a pressure on an elastic wall inside an expansion chamber and contracts and reduces pressure on an elastic wall inside an expansion chamber, or by moving an element or ring, through actuators, when fluids expand and contract in the expansion chambers. The engine further includes a heat source and a structure for supporting the expansion chambers and heat source, and providing direction of a desired motion.

6 Claims, 4 Drawing Sheets

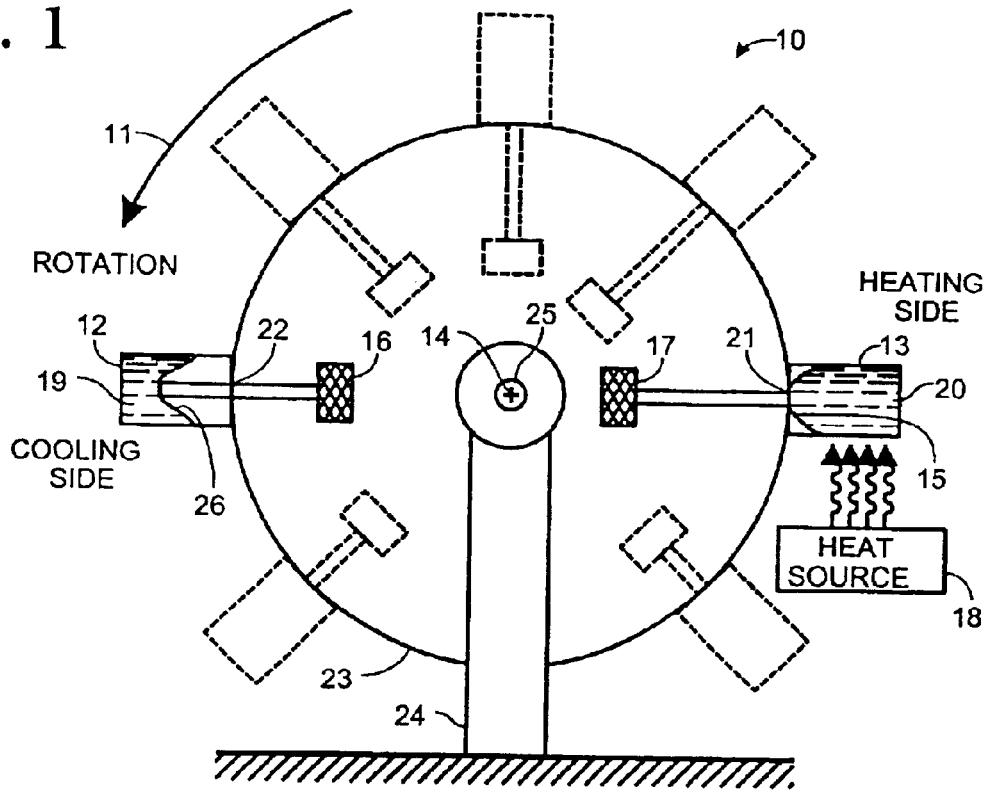
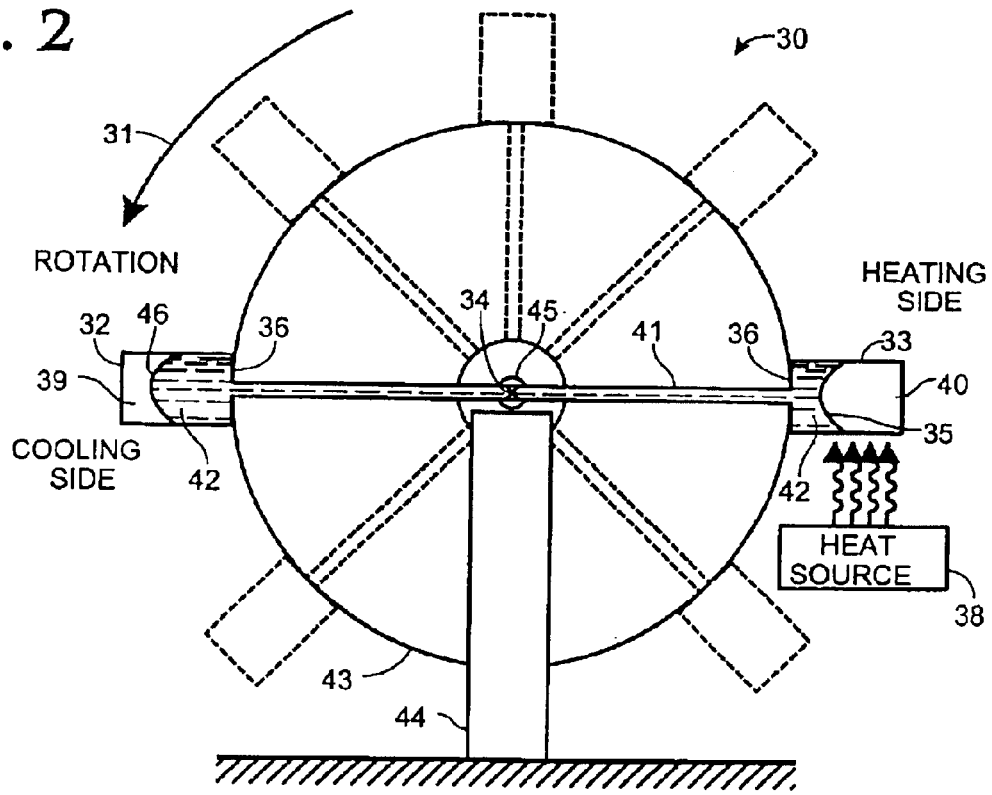

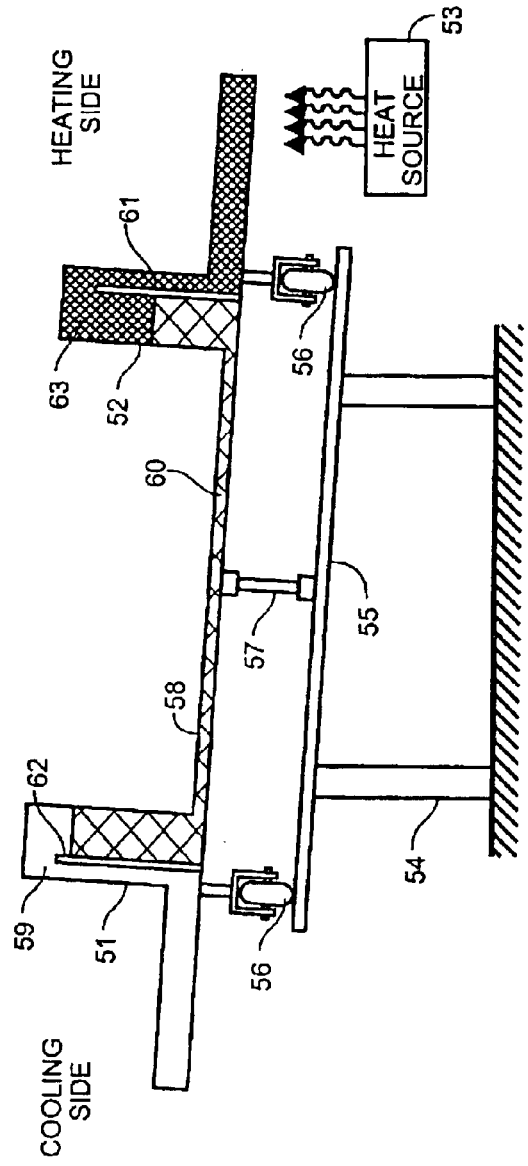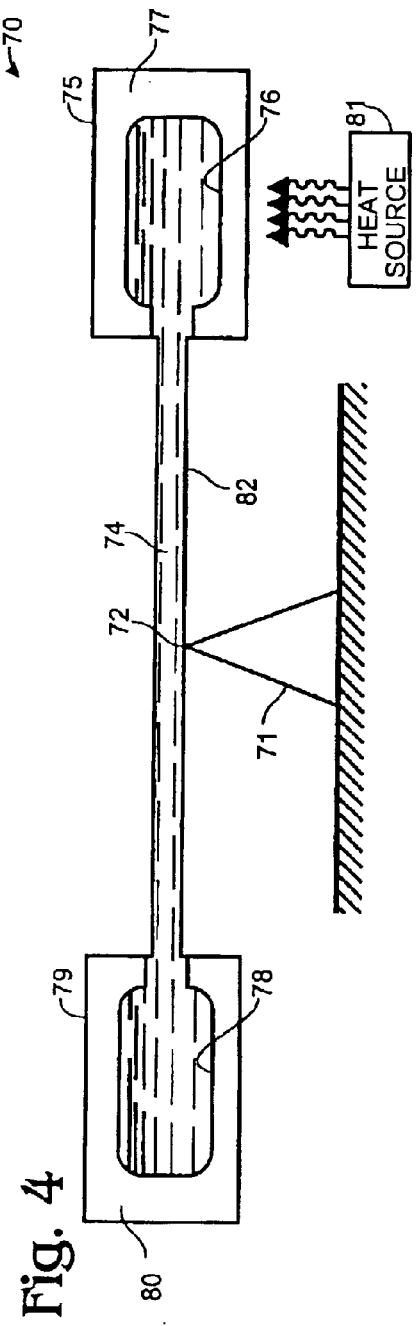

APPARATUS AND METHOD FOR A HEAT ENGINE

This application is a divisional of application Ser. No. 09/931,607, filed Aug. 16, 2001 abandoned.

BACKGROUND OF THE INVENTION

1. Field of the Invention

The present invention relates to a heat engine, and more particularly to a heat engine that shifts weight off-balance, or moves actuators, to provide a rotational motion.

2. Description of Prior Art

There are various converters known for transforming heat energy into mechanical energy. One type known in the art is a differential-temperature heat engine that operates on the basis of a vapor pressure differential between two chambers. The operation requires gravitational forces to provide motion that occurs when evaporation of the liquid in one chamber is condensed back into another chamber. The increasing weight of the condensed liquid causes the pivoting of the system about a rotational axis. However, in engines utilizing a liquid that is transferred from one side to the opposite side of the rotation axis, there is a need to make use of a connecting channel between diametrically opposed chambers of the engine. This complicates construction of the engine because this channel is associated with structural elements supporting the chambers that must have the means for pivoting the assembly of the chambers, as well as the supporting structural elements about a pivot shaft. Furthermore, the liquid transfer through this channel results in a pressure drop that decreases. Accordingly, the power produced by this engine that is based on the transfer of liquid under pressure results in severe leakage problems. What is needed is a heat engine that is simple to construct and free of maintenance problems that reduce the operating ability of the engine.

3. Objects and Advantages

It is an aspect of the claimed invention to expand or contract a fluid on the same side and plane of a rotational axis, to shift a weight off-balance that allows the engine to pivot about the axis from gravitational forces.

It is yet another aspect of the claimed invention to provide an engine that is simple to construct and easy to maintain.

SUMMARY OF THE INVENTION

A heat engine includes a plurality of heating side expansion chambers and cooling side expansion chambers, positioned on opposite sides of an axis, for providing rotation of an apparatus about its axis when the fluids expand and contract, on the same side and plane of a rotational axis. This is accomplished by, shifting the weight of fluids off-balance, or a weight, when the fluid, expands and exerts a pressure on an elastic wall inside an expansion chamber and contracts and reduces pressure on an elastic wall inside an expansion chamber, or by moving an element or ring, through actuators, when fluids expand and contract in the expansion chambers. The engine further includes a heat source and a structure for supporting the expansion chambers and heat source, and providing direction of a desired motion.

A method of operating a heat engine includes engaging a heat source, and heating and cooling a plurality of expansion chambers for expanding or contracting a fluid that shifts the weight of pistons to an off-balance position providing a rotational motion of the apparatus. Also, the heat engine structure is operated to provide reciprocating, rotating or linear direction from the rotational motion of the apparatus.

BRIEF DESCRIPTION OF THE DRAWINGS

The present invention will be more fully understood and appreciated by reading the following Detailed Description in conjunction with the accompanying drawings, in which:

FIG. 1 shows a cross-section of the heat engine rotating about an axis using a liquid in a preferred embodiment of the invention.

FIG. 2 shows a cross-section of the heat engine rotating about an axis using a gas in a preferred embodiment of the invention.

FIG. 3 shows a cross-section of the heat engine rotating in a horizontal plane using a liquid in another embodiment of the invention.

FIG. 4 shows a cross-section of the heat engine rotating in a horizontal plane using a gas in another embodiment of the invention.

DETAILED DESCRIPTION

Figure 5:
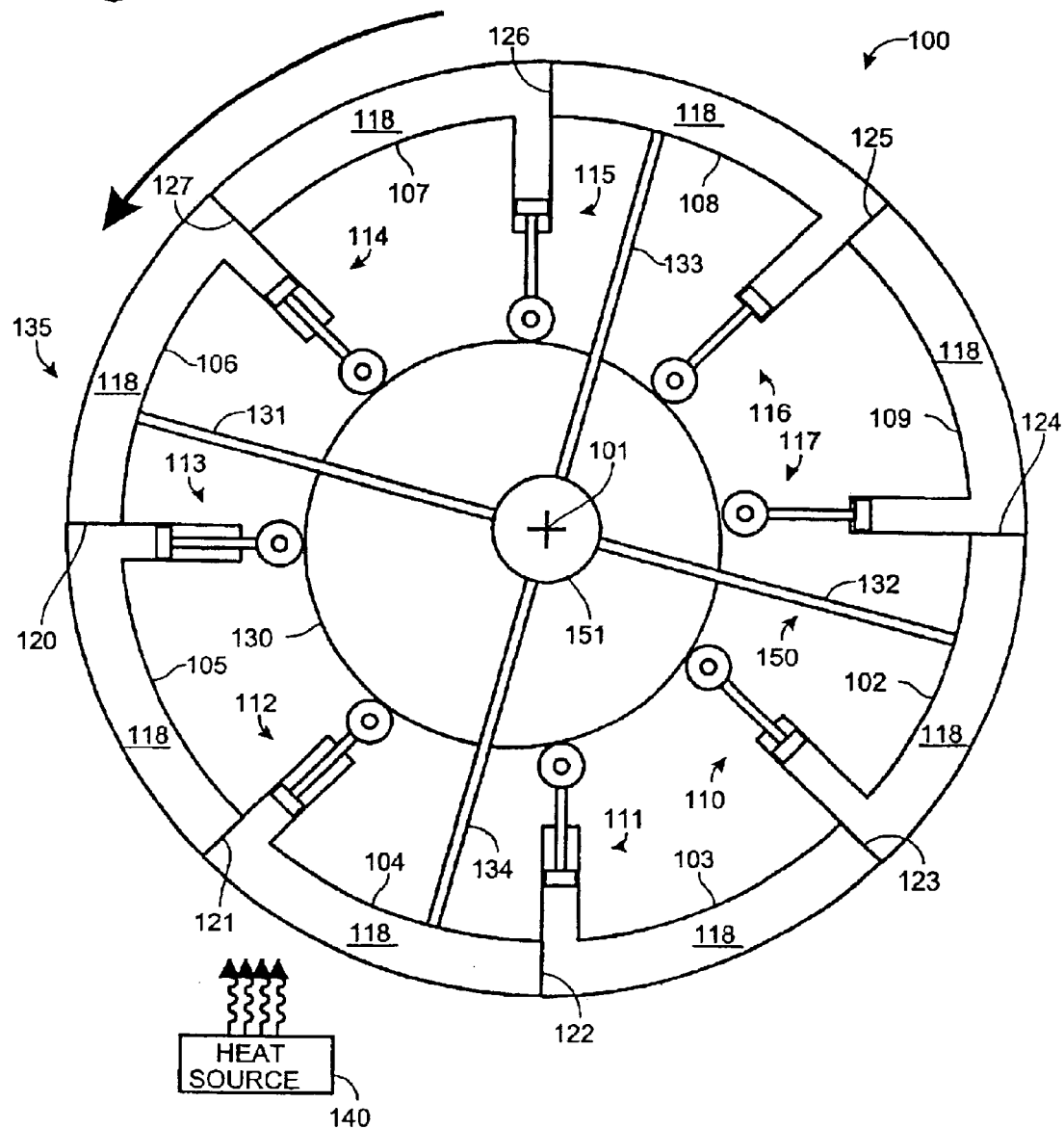
FIG. 5 shows a cross-section of the heat engine reciprocating about an axis using an off-center element in another embodiment of the invention.

While the claimed invention is described below with reference to a heat engine, a practitioner in the art will recognize the principles of the claimed invention are viable in other applications.

FIG. 1 shows apparatus 10 rotating counter-clockwise 11 with a cooling side expansion chamber 12 diametrically opposed to a heating side expansion chamber 13 that rotates about axis 14. As heat 18 is supplied to heating-side chamber 13, a second fluid 20 expands and exerts a force against a first wall 15 that pushes a second moment element 17 toward axis 14. At the same time a first fluid 19 in cooling-side chamber 12 is cooling, and contracts, reducing a force against a second wall 26 where a first moment element 16 pulls away from axis 14. The first fluid 19 and second fluid 20 is water. However, the fluid can be a plurality of expandable liquids The first moment element 16 and second moment element 17 are generally a piston, or a weight attached to a shaft that move toward or away from axis 14. The cooling source is ambient air. However, cooling may be from a plurality of sources including water or refrigeration. The result of a second moment element 17 being pushed toward and close to axis 14, while a first moment element 16 is contracted and pulled away from axis 14, allows gravity to rotate element 23, when the heat 18 is applied, by shifting the weight of the first moment element 16 and second moment element 17 to an off-balance condition. The element 23 rotates clockwise 11 when the heat 18 supply is mounted on one side of the apparatus 10 structure 24. A practitioner in the art can readily understand the heat engine will rotate clockwise if the heat 18 supply is mounted on the opposite side of the apparatus 10 structure 24.

The apparatus 10 includes cooling-side chamber 12 and heating-side chamber 13 is solidly connected to element 23, and rotates around axis 14 using element 25 that communicates with structure 24. The first wall 15 of heating-side chamber 13 and second wall 26 of cooling-side chamber 12 are a plurality of devices including but not limited to a flexible membrane, diaphragm, or bladder. A practitioner in the art understands first wall 15 and second wall 22 are also an elastic membrane, diaphragm, or bladder The second fluid 20 in expansion chamber 13 and first fluid 19 in expansion chamber 12 are highly expandable liquid when heated. However, the fluids are a gas in another embodiment of the claimed invention. The second moment element 17 communicates and is solidly connected 21 to the first wall 15 in heating-side chamber 13. The first moment element 16 communicates and is solidly connected 22 to the second wall 26 in cooling-side chamber 12. A practitioner in the art readily understands that heat 18 is received from a plurality of sources including but not limited to solar energy, gas combustion, body heat, electric heating, solid combustion, nuclear, waste heat and the like. Furthermore, the expansion chambers, either for heating or cooling, can be a plurality in number, shape and size depending upon the application. Also, one side of the expansion chambers can be transparent for additional solar heating. Furthermore, apparatus 10 can be designed to produce a directional motion that is rotational, reciprocating or linear from its output rotation. Finally, the cooling side expansion chambers lag the heating side expansion chamber about 45 to 180 degrees.

In FIG. 2, apparatus 30 is shown rotating counter-clockwise 31 with a cooling side expansion chamber 32 diametrically opposed and connected 36 to a heating side expansion chamber 33 that rotates about axis 34. As heat 38 is supplied to heating-side chamber 33, a second fluid 40 expands and exerts a force against a first wall 35 pushing a third fluid 42 out of the heating-side chamber 33 toward, and into, the cooling-side chamber 32. At the same time a first fluid 39 in the cooling-side chamber 32 is cooling, and contracting, reducing a force against a second wall 46 where a third fluid 42 moves into cooling-side chamber 32 from heating-side chamber 33. The cooling source is ambient air. However, cooling may be from a plurality of sources including water or refrigeration. The result of cooling-side chamber 32 filling with a third fluid 42, and heating-side chamber 33 being emptied of a third fluid 42, allows gravity to rotate element 43, when the heat 38 is applied, by shifting the weight of the fluids off-balance. The element 43 rotates counter-clockwise 31 when the heat 38 supply is mounted on one side of the apparatus 30 structure 44. A practitioner in the art can readily understand the heat engine will rotate clockwise if the heat 38 supply is mounted on the opposite side of the apparatus 30 structure 44. Finally, channel 41 is a tube, pipe or hose connecting the heating-side chamber 33 to cooling-side chamber 32.

The apparatus 30 includes cooling-side chamber 32 and heating-side chamber 33 solidly connected 36 to element 43 that rotates around axis 34 using rotating connection 45 that communicates with structure 44. A channel 41 that carries a third fluid 42 between the chambers interconnects the cooling-side chamber 32 and heating-side chamber 33. The first wall 35 of heating-side chamber 33 and second wall 40 of cooling-side chamber 32 are a plurality of devices including but not limited to an elastic membrane, diaphragm, and bladder, or a flexible membrane, diaphragm and bladder. The second fluid 40 in heating-side chamber 33 and the first fluid 39 in cooling-side chamber 32 are highly expandable gases when heated with air being the preferred gas. However, the first fluid 39 and second fluid 40 can also be a highly expandable liquid. The third fluid 42 is a non-compressible liquid that travels from heating-side chamber 33 to cooling-side chamber 32, when a heat 38 source is applied, as a result of the expansion of the first wall 35 and contraction of the second wall 46. A practitioner in the art readily understands that heat 38 is received from a plurality of sources including but not limited to solar energy, gas combustion, electric heating, body heat solid fuel, waste heat, nuclear, and the like. Furthermore, the heating-side chamber 33 and cooling-side chamber 32, are a plurality in number, shape and size depending upon the application. Also, one side of the expansion chambers can be transparent for additional solar heating. Finally, apparatus 30 can be designed to produce an output motion that is rotational, reciprocating, or linear. Finally, the cooling side expansion chambers lag the heating side expansion chamber about 45 to 180 degrees. Nevertheless, a system with a single cooling-side and heating-side chamber will work by itself by heating at the bottom and cooling at the top.

FIG. 3 shows apparatus 50 with a cooling side chamber 51 and a heating side chamber 52 mounted on an off-level plane 55 fixed in place by structure 54. The cooling-side chamber 51 and heating-side chamber 52, diametrically opposed about axis 57, are interconnected by channel 58 and rotates around axis 57 with wheels 56 contacting the off-level plane 55. The cooling side chamber 51 contains an internal first baffle 62, with a second fluid 60, inside cooling-side chamber 51 on the side of the first baffle 62 connected by channel 58. The opposite side of the first baffle 62 in chamber 51 contains a first fluid 59. The heating side chamber 52 contains an internal second baffle 63, with a second fluid 60, inside heating-side chamber 52 on the side of the second baffle 63 connected by channel 58. The opposite side of second baffle 63 in heating-side chamber 52 contains a third fluid 61. As heat 53 is applied to the heating side chamber 52, the third fluid 61 expands around the second baffle 63 pushing the second fluid 60 toward the cooling side chamber 51. The inside of cooling-side chamber 51 the second fluid 60 rises and collects pushing the first fluid 59 around the first baffle 62. The cooling source is ambient air. However, cooling may be from a plurality of sources including water or refrigeration. The result is a shift in weight from the heating side chamber 52 to the cooling side chamber 51, on the off-level plane 55, allowing rotation of apparatus 50 in the horizontal plane. The shift in weight creates an off-balance with gravity moving the off-balance weight into a stable condition. The rotation moves cooling-side chamber 51 to the heating side where the chambers reverse, the cooling-side becoming the heating-side and vice versa. The process pushes the second fluid 60 back toward chamber 52, now the cooling-side chamber, and rotation of apparatus 50 continues. The third fluid 61, and the first fluid 59 are the same highly expandable gas, with air being the preferable gas. The second fluid 60 is a plurality of liquids with water being the preferable liquid. The heat 53 source can be a plurality of sources including but not limited to gas burner, electric, nuclear, waste heat, body heat, solid fuel, or solar energy. A practitioner in the art will readily see that chamber 51 and chamber 52 can be a plurality of shapes and sizes depending upon the application. Furthermore, heat 53 sources can be mounted on the opposite side of apparatus 50, with the off-level plane 55 tilting in a reverse direction that will allow apparatus 50 to rotate in the opposite direction. Finally, the cooling side expansion chambers lag the heating side expansion chamber about 45 to 180 degrees.

As seen in FIG. 4, looking at apparatus 70 in the vertical plane, cooling-side chamber 79 and heating-side chamber 75 are diametrically opposed about axis 72, interconnected by channel 82, and rotatably mounted on structure 71. Chamber 79 contains expandable element 78, and chamber 75 contains expandable element 76. The expandable element 78 and expandable element 76 are a plurality of devices, including but not limited to an elastic bladder, membrane, and diaphragm, or a flexible bladder, membrane, and diaphragm. As heat 81 is applied to chamber 75, a second fluid 77 expands collapsing a first element 76 pushing a first fluid 74 toward and expanding a second element 78, of chamber 79, where a third fluid 80 is compressed as it is cooled. The cooling source is ambient air. However, cooling may be from a plurality of sources including water or refrigeration. Consequently, as a first fluid 74 is pushed out of the first element 76 and into the second element 78 an off-balance of weight occurs where gravity moves apparatus 70, rotating about axis 72, into a stable condition. The process is repeated as chamber 79 comes into contact with the heat 81 source further allowing rotation about axis 72. In this embodiment of the preferred invention fluid 77 and fluid 80 are a gas and 74 is a liquid. However, a practitioner in the art readily understands that fluid 77 and fluid 80 can be a highly expandable liquid and 74 can be a gas. Furthermore chamber 75, first element 76, chamber 79 and second element 78 can be a plurality in number, shapes, and sizes depending on the application. The cooling side expansion chambers lag the heating side expansion chamber about 45 to 180 degrees. Also, heat 81 source can be mounted on the opposite side of axis 72 allowing the apparatus 70 to rotate in a reverse direction. Finally, heat 81 can be a plurality of sources including gas heating, solid fuel, solar energy, nuclear or electric resistance.

FIG. 5 shows a reciprocating heat engine apparatus 100, with a fixed element 130 whose center is offset from an axis 101 The apparatus 100 contains a first chamber 102, a second chamber 103, a third chamber 104, a fourth chamber 105, a fifth chamber 106, a sixth chamber 107, a seventh chamber 108, and an eighth chamber 109, positioned radial about axis 101. The first chamber 102 communicates with the second chamber 103 at a fifth wall 123. The second chamber 103 communicates with the third chamber 104 at a fourth wall 122. The third chamber 104 communicates with the fourth chamber 105 at a third wall 121. The fourth chamber 105 communicates with the fifth chamber 106 at a second wall 120. The fifth chamber 106 communicates with the sixth chamber 107 at a first wall 119. The sixth chamber 107 communicates with the seventh chamber 108 at an eighth wall 126. The seventh chamber 108 communicates with an eighth chamber 109 at a seventh wall 125. Finally, the eighth chamber 109 communicates with the first chamber 102 at a sixth wall 124.

Each chamber contains an inward moving, to element 130, actuator radial to axis 101. The first chamber 102 contains a first actuator 110. The second chamber 103 contains a second actuator 111. The third chamber 104 contains a third actuator 112. The fourth chamber 105 contains a fourth actuator 113. The fifth chamber 106 contains a fifth actuator 114. The sixth chamber 107 contains a sixth actuator 115. The seventh chamber 108 contains a seventh actuator 116. Finally, the eighth chamber 109 contains an eighth actuator 117.

The first actuator 110, second actuator 111, third actuator 112, fourth actuator 113, fifth actuator 114, sixth actuator 115, seventh actuator 116, and eighth actuator 117 communicate radial with an off center internally fixed element 130 that is usually a cam or crank shaft. The fixed element 130 whose center is offset from axis 101 produces a rotation about axis 101 as the actuators move inward toward axis 101 and outward from axis 101. The first chamber 102 and fifth chamber 106 are diametrically opposed about axis 101. The second chamber 103 and sixth chamber 107 are diametrically opposed about axis 101. The third chamber 104 and seventh chamber 108 are diametrically opposed about axis 101. The fourth chamber 105 and eighth chamber 109 are diametrically opposed about axis 101. The chambers are solidly connected together, by a first spoke 131 at the fifth chamber 106, by a second spoke 132 at the first chamber 102, by a third spoke 133 at the seventh chamber 108, and by a fourth spoke 134 at the third chamber 104, comprising structure 150 that is rotate-able about axis 101. The expansion chambers are about 45 degrees apart. This distance can vary about 22 to 180 degrees depending upon the number of chambers and actuators in a particular design. A practitioner in the art understands that there can be a plurality of chambers in number, shape and size. Also, the actuators are pistons, push rods, or the like. Finally, the structure 150 is connected to shaft 151 and does not communicate with element 130.

The fluid 118 located in all chambers is a highly expandable liquid or gas. A heat 140 source is located externally to the chambers and can be generated from gas combustion, solar energy, solar concentrating lens, nuclear, waste heat solid fuel or electric. The cooling source is ambient air. However, cooling may be from a plurality of sources including water or refrigeration.

The heat 140 expands fluid 118 in the third chamber 104 when it comes into contact with the chamber. The expanded fluid 118 exerts a pressure that pushes the third actuator 112 extending it into and exerting a force on element 130. Concurrently, the diametrically opposed seventh chamber 108 contains fluid 118 that is cooling and contracting allowing the seventh actuator 116 to retract that reduces a force on element 130. This occurs with each set of diametrically opposed, about axis 101, chambers and actuators creating a reciprocating engine. The element 130 is fixed off-center from axis 101. When the actuators exert a force against the fixed off-center element 130, the force exerted against element 130 allows ring 150 to rotate.

Figure 6:
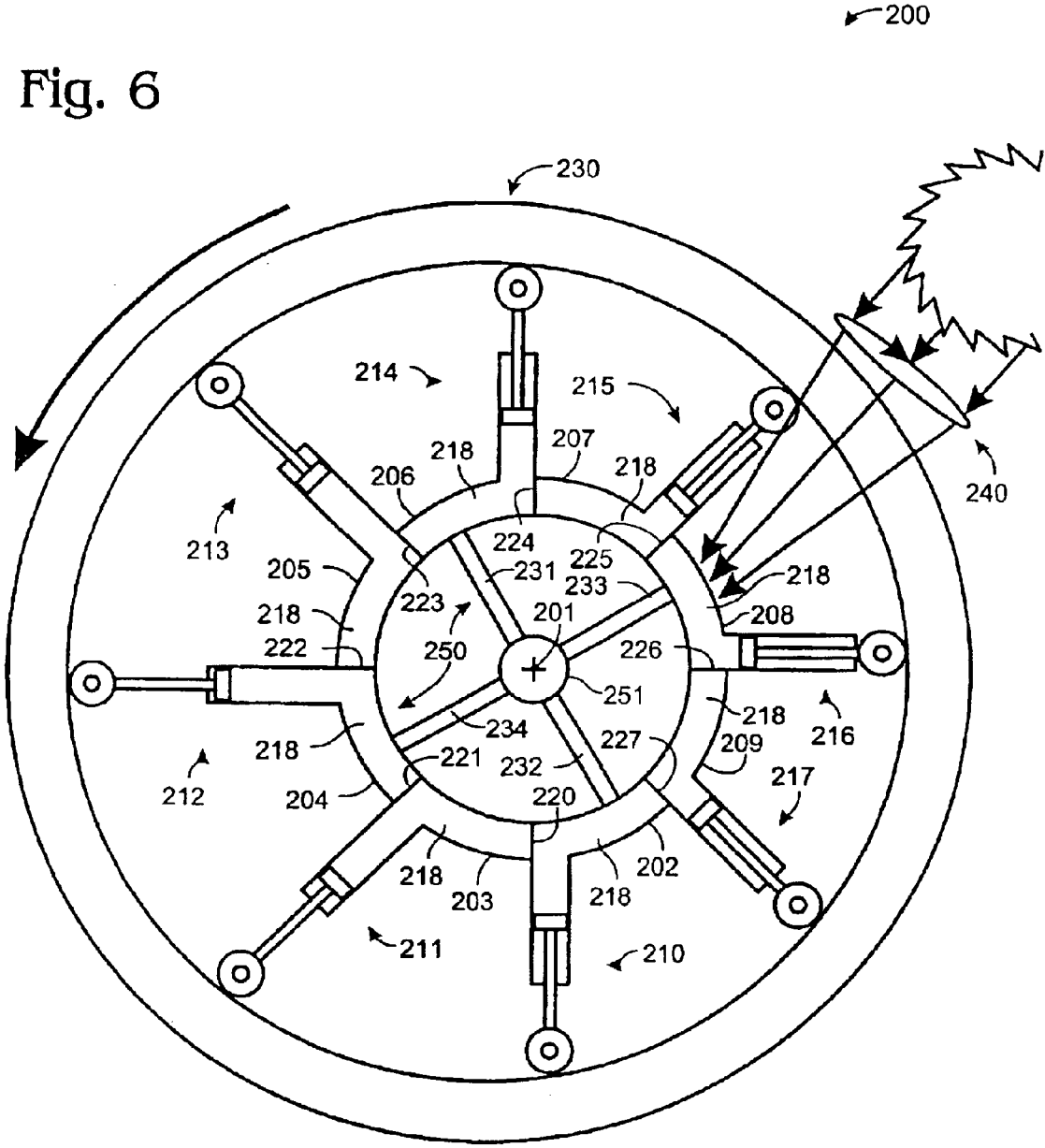
FIG. 6 shows a cross-section of the heat engine reciprocating about an axis using a ring in another embodiment of the invention.

An opposite arrangement, as shown in FIG. 6, is possible with the chambers positioned at the center of an apparatus 200 pushing outward against a fixed ring 230 whose center is offset from the axis 201. The apparatus 200 contains a first chamber 202, a second chamber 203, a third chamber 204, a fourth chamber 205, a fifth chamber 206, a sixth chamber 207, a seventh chamber 208, and an eighth chamber 209, positioned radial about axis 201. The first chamber 202 communicates with the second chamber 203 at a first wall 220. The second chamber 203 communicates with the third chamber 204 at a second wall 221. The third chamber 204 communicates with the fourth chamber 205 at a third wall 222. The fourth chamber 205 communicates with the fifth chamber 206 at a fourth wall 223. The fifth chamber 206 communicates with the sixth chamber 207 at a fifth wall 224. The sixth chamber 207 communicates with the seventh chamber 208 at a sixth wall 225. The seventh chamber 208 communicates with an eighth chamber 209 at a seventh wall 226. Finally, the eighth chamber 209 communicates with the first chamber 202 at an eighth wall 227.

Each chamber contains an outward moving actuator to ring 230 radial to axis 201. The first chamber 202 contains a first actuator 210. The second chamber 203 contains a second actuator 211. The third chamber 204 contains a third actuator 212. The fourth chamber 205 contains a fourth actuator 213. The fifth chamber 206 contains a fifth actuator 214. The sixth chamber 207 contains a sixth actuator 215. The seventh chamber 208 contains a seventh actuator 216. Finally, the eighth chamber 209 contains an eighth actuator 217.

The first actuator 210, second actuator 211, third actuator 212, fourth actuator 213, fifth actuator 214, sixth actuator 215, seventh actuator 216, and eighth actuator 218 communicate radial with external ring 230 whose center is offset from axis 201. The first chamber 202 and fifth chamber 206 are diametrically opposed about axis 201. The second chamber 203 and sixth chamber 207 are diametrically opposed about axis 201. The third chamber 204 and seventh chamber 208 are diametrically opposed about axis 201. The fourth chamber 205 and eighth chamber 209 are diametrically opposed about axis 201. The chambers are solidly connected together, by a first spoke 231 at the fifth chamber 206, by a second spoke 232 at the first chamber 202, by a third spoke 233 at the seventh chamber 208, and by a fourth spoke 234 at the third chamber 204, comprising structure 250 that is fixed off-center about axis 201. The expansion chambers are about 45 degrees apart. This distance can vary about 22 to 180 degrees depending upon the number of chambers and actuators in a particular design. A practitioner in the art understands that there can be a plurality of chambers in number, shape and size. Also, the actuators are pistons, push rods, or the like. Finally, structure 250 is fixedly connected to shaft 251.

The fluid 218 located in all chambers is a highly expandable liquid or gas. A heat 240 source is located externally to the chambers and can be generated from gas combustion, solar energy, a solar concentrating lens, nuclear, waste heat solid fuel or electric.

The cooling source is ambient air. However, cooling may be from a plurality of sources including water or refrigeration.

The heat 240 expands fluid 218 in the seventh chamber 208 when it comes into contact with the chamber. The expanded fluid 218 exerts a pressure that pushes the seventh actuator 216 extending it into ring 230. Concurrently, the diametrically opposed third chamber 204 contains fluid 218 that is cooling and contracting allowing the third actuator 212 to retract. This occurs with each set of diametrically opposed, about axis 201, chambers and actuators creating a reciprocating engine. The ring 230 rotates at the actuators push against it because the structure 250 is positioned off-center of axis 201.

Now referring back to FIG. 1, a method of operating a heat engine apparatus 10 includes engaging a heat 18 source. This could include starting gas or solid fuel combustion to generate heat. It could also use solar energy or nuclear energy to generate heat. The next step is heating fluid 20, in expansion chamber 13, expanding fluid 20 that exerts a force against wall 15 and pushes piston 17 toward axis 14. Concurrently, the step of cooling fluid 19, in expansion chamber 12, contracting fluid 19 that reduces a force against wall 20 and pulls piston 16 away from axis 14. The cooling source is ambient air. However, cooling may be from a plurality of sources including water or refrigeration. A plurality of expansion chambers can be heated and cooled with fluids inside the expansion chambers, allowing shifting of the weight of the pistons to an off-balance position and thereby providing a motion. Also, the heat engine structure is operated to provide direction of a motion that is rotational, reciprocating or linear depending on the application. Similar operation occurs with apparatus 30 in FIG. 2, apparatus 50 in FIG. 3, and apparatus 100 in FIG. 5.

In referring back to FIGS. 1 through 6, there can be a plurality of materials of construction including but not limited to metals or plastics or a combination thereof.

While there has been illustrated and described what is at present considered to be a preferred embodiment of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A heat engine for converting thermal energy into kinetic energy, comprising:
   a structure capable of rotating about a center axis;
   a non-rotating element, positioned within said structure and having a substantially smooth and circular outer surface, the center of said non-rotating element offset from said center axis and fixed in position relative to said center axis;
   a plurality of working chambers evenly distributed about the perimeter of said structure, each of said plurality of working chambers containing substantially equal amounts of working fluid;
   a plurality of cylinders, each of said plurality of cylinders in fluid communication with one of said plurality of working chambers, each of said plurality of cylinders radially positioned about said axis;
   a plurality of pistons, each of said plurality of pistons comprising a working end and a rolling end, each working end of said plurality of pistons in mechanical communication with one of said plurality of cylinders and each rolling end of said plurality of pistons biased against said non-rotating element's outer surface,
   wherein the application of heat energy to any of said plurality of working chambers will cause expansion of said working fluid, increasing the bias of said working chamber's corresponding piston against said non-rotating element and inducing said structure to rotate to reduce said bias.

2. The heat engine of claim 1 further comprising a heat source, said heat source being generally fixed in position relative to said non-rotating element for heating said working fluid in at least one of said plurality of working chambers.

3. The heat engine of claim 1 wherein said plurality of pistons is an even number and each of said plurality of pistons is directly opposed to another of said plurality of pistons.

4. A heat engine for converting thermal energy into kinetic energy, comprising:
   a fixed ring, having a first axis at its center and having a substantially smooth inner surface;
   an element, positioned within said fixed ring and rotating about a second axis, said second axis offset from and parallel with said first axis and said second axis fixed in position relative to said first axis;
   a plurality of working chambers positioned about the perimeter of said element, each of said plurality of working chambers containing substantially equal amounts of working fluid;
   a plurality of cylinders, each of said plurality of cylinders in fluid communication with said plurality of working chambers and each of said plurality of cylinders radially positioned about said second axis;
   a plurality of pistons, each of said plurality of pistons comprising a working end and a rolling end, each working end of said plurality of pistons in mechanical communication with one of said plurality of cylinders and each rolling end of said plurality of pistons biased against said fixed ring's inner surface,
   wherein the application of heat energy to any of said plurality of working chambers will cause expansion of said working fluid, increasing the bias of said working chamber's corresponding piston against said fixed ring's inner surface and inducing said element to rotate to reduce said bias.

5. The heat engine of claim 4 further comprising a heat source, said heat source being generally fixed in position relative to said fixed ring for heating said working fluid in at least one of said plurality of working chambers.

6. The heat engine of claim 4 said plurality of pistons is an even number and each of said plurality of pistons is directly opposed to another of said plurality of pistons.

* * * * *

UNITED STATES PATENT AND TRADEMARK OFFICE
CERTIFICATE OF CORRECTION

PATENT NO. : 6,922,998 B2
DATED : August 2, 2005
INVENTOR(S) : George E. Bittner It is certified that error appears in the above-identified patent and that said Letters Patent is hereby corrected as shown below:

Title page,
Item [75], Inventor, the word "Hattenback" should be deleted and substituted with
-- Hallenbeck --.

Signed and Sealed this

Eleventh Day of October, 2005

JON W. DUDAS
*Director of the United States Patent and Trademark Office*